United States Patent [19]

Paton et al.

[11] Patent Number: 5,410,628
[45] Date of Patent: Apr. 25, 1995

[54] OPTICAL TAPPING DEVICE FOR USE IN CONJUNCTION WITH AN OPTICAL FIBER MANAGEMENT DEVICE

[75] Inventors: Colin R. Paton; David A. Ferguson; Dominik Drouet, all of Ipswich; Peter L. J. Frost, Kesgrave; John Kerry, Ipswich, all of England

[73] Assignee: British Telecommunications public limited company, London, England

[21] Appl. No.: 107,703

[22] PCT Filed: Jun. 25, 1992

[86] PCT No.: PCT/GB92/01152
§ 371 Date: Aug. 18, 1993
§ 102(e) Date: Aug. 18, 1993

[87] PCT Pub. No.: WO93/00600
PCT Pub. Date: Jan. 7, 1993

[30] Foreign Application Priority Data

Jun. 25, 1991 [GB] United Kingdom ............... 9113696
Apr. 13, 1992 [GB] United Kingdom ............... 9208105

[51] Int. Cl.⁶ ............................................. G02B 6/24
[52] U.S. Cl. ................................ 385/48; 385/31; 385/32; 385/24; 385/42; 385/48; 385/39; 385/134
[58] Field of Search ................... 385/14, 15, 16, 24, 385/25, 27, 28, 31, 32, 38, 39, 42, 44, 46, 48, 49, 50, 134, 135, 136, 137, 139

[56] References Cited

U.S. PATENT DOCUMENTS

| | | | |
|---|---|---|---|
| 4,671,653 | 6/1987 | So et al. | 356/73.1 |
| 4,741,584 | 5/1988 | Segerson | 385/48 X |
| 4,747,652 | 5/1988 | Campbell et al. | 385/48 X |
| 4,749,249 | 6/1988 | Hockaday et al. | 385/32 X |
| 4,759,605 | 7/1988 | Shen et al. | 385/32 X |
| 4,887,880 | 12/1989 | Levinson | 385/48 X |
| 4,889,403 | 12/1989 | Zucker et al. | 385/32 X |
| 4,983,007 | 1/1991 | James et al. | 385/32 X |
| 4,989,939 | 2/1991 | Cox et al. | 385/32 X |
| 5,040,866 | 8/1991 | Engel | 385/32 |
| 5,069,519 | 12/1991 | James et al. | 385/32 |
| 5,090,792 | 2/1992 | Koht et al. | 385/32 |
| 5,235,657 | 8/1993 | Tardy | 385/32 X |
| 5,315,675 | 5/1994 | Dennis et al. | 385/32 |
| 5,343,541 | 8/1994 | Uken et al. | 385/16 |

FOREIGN PATENT DOCUMENTS

| | | | |
|---|---|---|---|
| 2236405 | 4/1991 | United Kingdom | 385/48 X |
| WO84/01835 | 5/1984 | WIPO | 385/48 X |
| WO90/13838 | 11/1990 | WIPO | 385/48 X |

Primary Examiner—Brian Healy
Attorney, Agent, or Firm—Nixon & Vanderhye

[57] ABSTRACT

Light transferred between an optical fibre housed within a fibre management unit and an optical device external to the fibre management unit. The transfer arrangement incudes an aperture formed in the fibre management unit, a mandrel mounted in the fibre management unit adjacent to the aperture and positioned so that the optical fibre lies between the mandrel and the aperture, and a probe housing the optical device. The probe is provided with an optical head in optical communication with the optical device, and with an arrangement for moving the optical head into the aperture so as to deform the optical fibre against the mandrel sufficiently to permit light to be tapped between the optical fibre and the optical head.

27 Claims, 3 Drawing Sheets

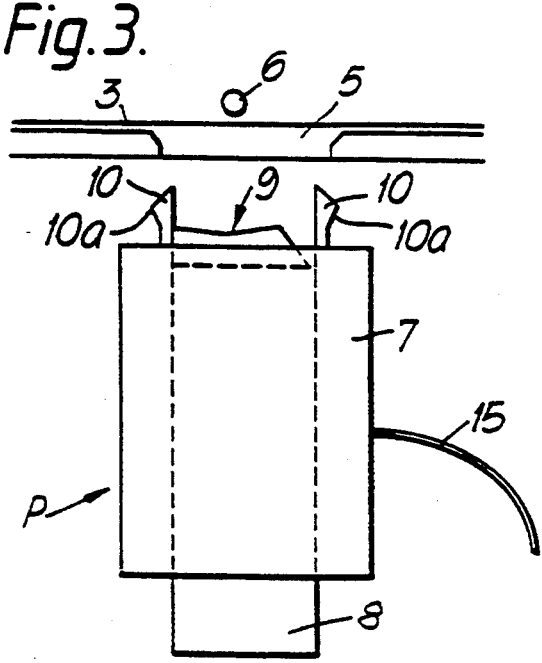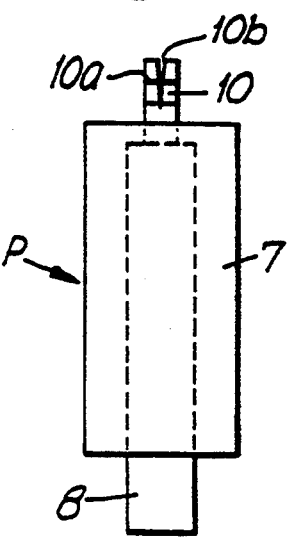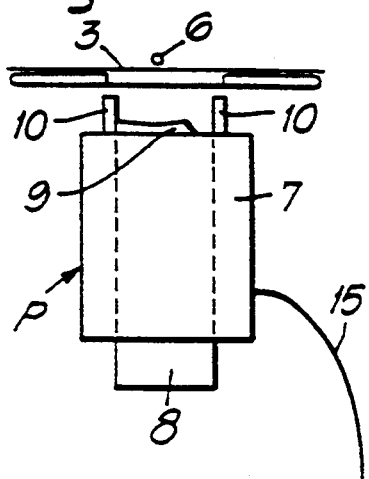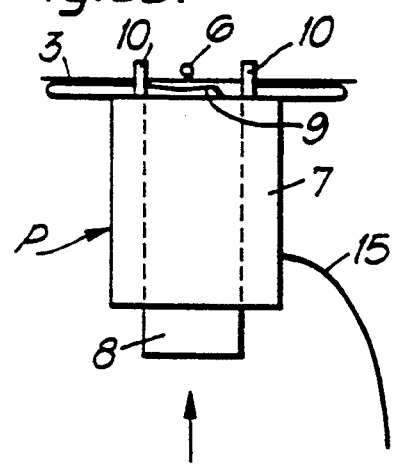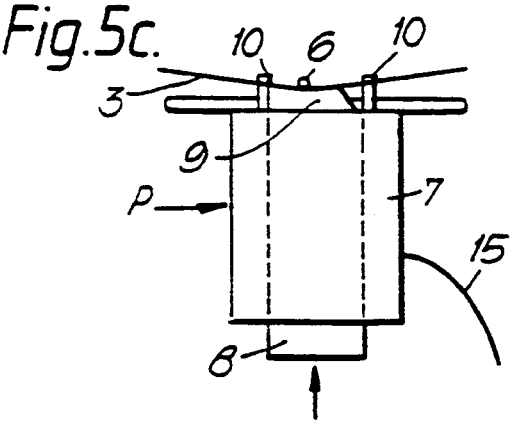

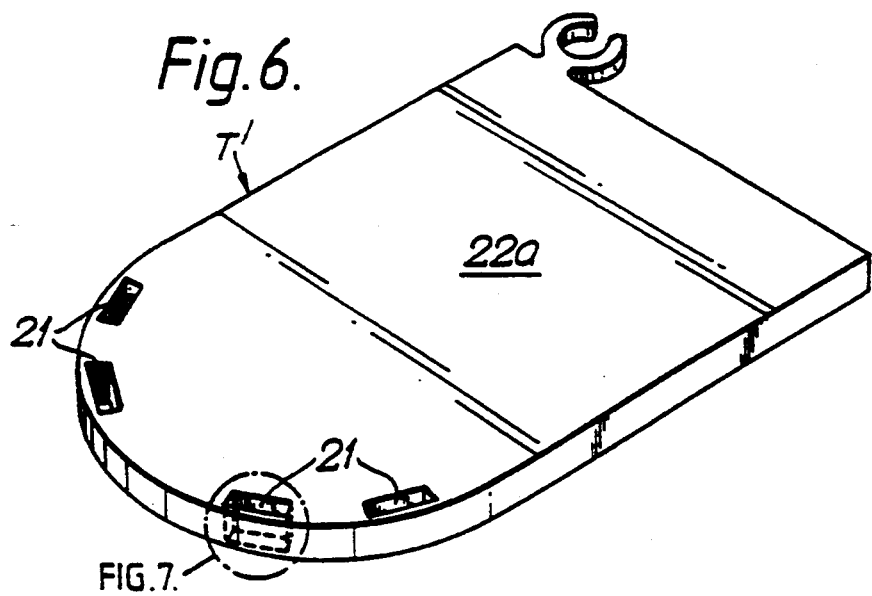
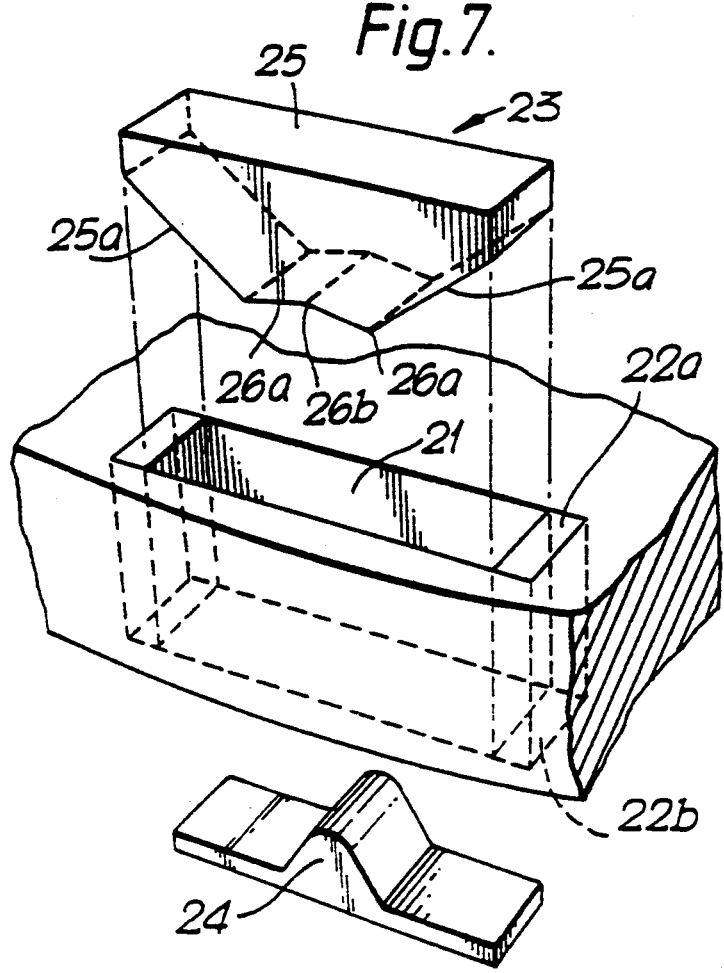

OPTICAL TAPPING DEVICE FOR USE IN CONJUNCTION WITH AN OPTICAL FIBER MANAGEMENT DEVICE

BACKGROUND OF THE INVENTION

1. Field of the Invention

This invention relates to means for transferring light between an optical fibre housed within a fibre management unit and an external optical device, and in particular to a probe for tapping out light from optical fibres in a splice tray.

2. Related Art

An optical fibre splice tray usually houses many (typically 16) spliced optical fibres. In the typical case, therefore, it has 16 input fibres, 16 output fibres and 16 splices, each splice joining respective input and output fibres. In determining the quality of the splices, it is necessary to measure the light passing along the associated input and output fibres, and this is often difficult to do, particularly where access to a splice tray is hampered, as is the case where splice trays are mounted in racks. Thus, in order to make measurements on one of these fibres, using a conventional power meter, it is necessary to remove that fibre from the tray, which inevitably means disturbing all the fibres, with the attendant possibility of compromising the integrity of the signals carried by these fibres.

This situation can be improved by using a splice tray having only two spliced fibres. This considerably reduces the possibility of disturbing the signals carried by fibres other than that being measured. Unfortunately, the fibre being measured must still be removed from its normal position in the tray, which means that there is still a high risk of imposing unacceptably high bending losses on the fibre being measured. Consequently, measurement cannot be carried out whilst the fibre is carrying signals (that is to say whilst the system is "live").

BRIEF SUMMARY OF THE INVENTION

The present invention provides transfer means for transferring light between an optical fibre housed within a fibre management unit and an optical device external to the fibre management unit, the transfer means comprising an aperture formed in the fibre management unit, and a probe housing the optical device, wherein the probe is provided with an optical head in optical communication with the optical device, and with means for moving the optical head into the aperture so as to deform the optical fibre against a mandrel sufficiently to permit light to be tapped between the optical fibre and the optical head, the mandrel being positioned, in use, so that the optical fibre lies between the mandrel and the aperture.

This form of light transfer means reduces the risks of measuring fibres in situ, and measurements can be made without taking off-line the system of which the splice under test forms a part.

In one preferred embodiment, the mandrel is mounted within the probe. Alternatively, the mandrel is mounted in the fibre management unit adjacent to the aperture and positioned so that the optical fibre lies between the mandrel and the aperture.

Advantageously, the probe comprises a housing and a support carrying the optical head, the support being movable relative to the housing thereby constituting the means for moving the optical head. Conveniently, a slide constitutes the support, and the housing is provided with locating lugs for locating the probe relative to the aperture. Preferably, the lugs are resilient. The lugs may be such as to clip onto the edges of the aperture, and may be provided with V-shaped recesses for holding and guiding an optical fibre.

In a preferred embodiment, the optical head is a recessed block made of a transparent material, the recess having a V-shaped cross-section. Preferably, the V-shaped recess is defined at two surfaces of the block which are inclined to one another by an angle lying within the range of from 150° to 179°.

For detector applications, it is advantageous for said angle to lie within the range of from 160° to 175°, the angle being at the lower end of the range for low insertion loss detection, and at the upper end for very low less detection. For launch application, however, it is preferable for said angle to lie within the range of from 150° to 160°, the angle being at the lower end of the range for high-efficiency launch, and at the higher end for low insertion loss launch. Preferably, the apex of the recess has a rounded cross-section, the radius of curvature of the rounded cross-section lying within the range of from 1.5 mm to 3 mm.

In a preferred embodiment, the optical device is a light detector, preferably a large area photodetector. Alternatively, the optical device is a light source such as a laser.

Preferably, the optical device is mounted on a surface of the block opposite to the recessed surface, and a side surface of the block is angled in such a manner that tapped light is subjected to total internal reflection at said side surface, and directed towards the optical device.

The fibre management unit may be a splice tray which contains a pair of spliced fibres, the splice tray being provided with four apertures, one for each fibre on each side of each splice, a respective mandrel being associated with each of the apertures.

The invention also provides a fibre management unit housing an optical fibre, an aperture being formed in the fibre management unit, wherein the aperture is adapted to cooperate with a probe housing an optical device and an optical head in optical communication with the optical device, the probe being provided with means for moving the optical head into the aperture so as to deform the optical fibre against a mandrel sufficiently to permit light to be tapped between the optical fibre and the optical head, the mandrel being positioned, in use, so that the optical fibre lies between the mandrel and the aperture.

The invention further provides a probe housing an optical device, the probe being adapted to transfer light between an optical fibre housed within a fibre management unit and the optical device via an aperture formed in the fibre management unit, wherein the probe is provided with an optical head in optical communication with the optical device, and with means for moving the optical head into the aperture so as to deform the optical fibre against a mandrel sufficiently to permit light to be tapped between the optical fibre and the optical head, the mandrel being positioned, in use, so that the optical fibre lies between the mandrel and the aperture.

BRIEF DESCRIPTION OF THE DRAWINGS

The invention will now be described in greater detail, by way of example, with reference to the accompanying drawings, in which:

FIG. 3 is a schematic front elevation of the probe of FIG. 1 together with an associated part of the splice tray;

FIG. 4 is a schematic side elevation of the probe of FIG. 1;

FIGS. 5a–5c are schematic representations, similar to that of FIG. 3, showing various stages in the process of fixing the probe of FIG. 1 to its splice tray;

FIG. 6 is a perspective view of a second form of splice tray constructed in accordance with the invention; and FIG. 7 is a schematic exploded perspective view, on an enlarged scale, of part of the splice tray of FIG. 6 and part of the optical head forming part of an associated probe.

DETAILED DESCRIPTION OF EXEMPLARY EMBODIMENTS

Figure 1:
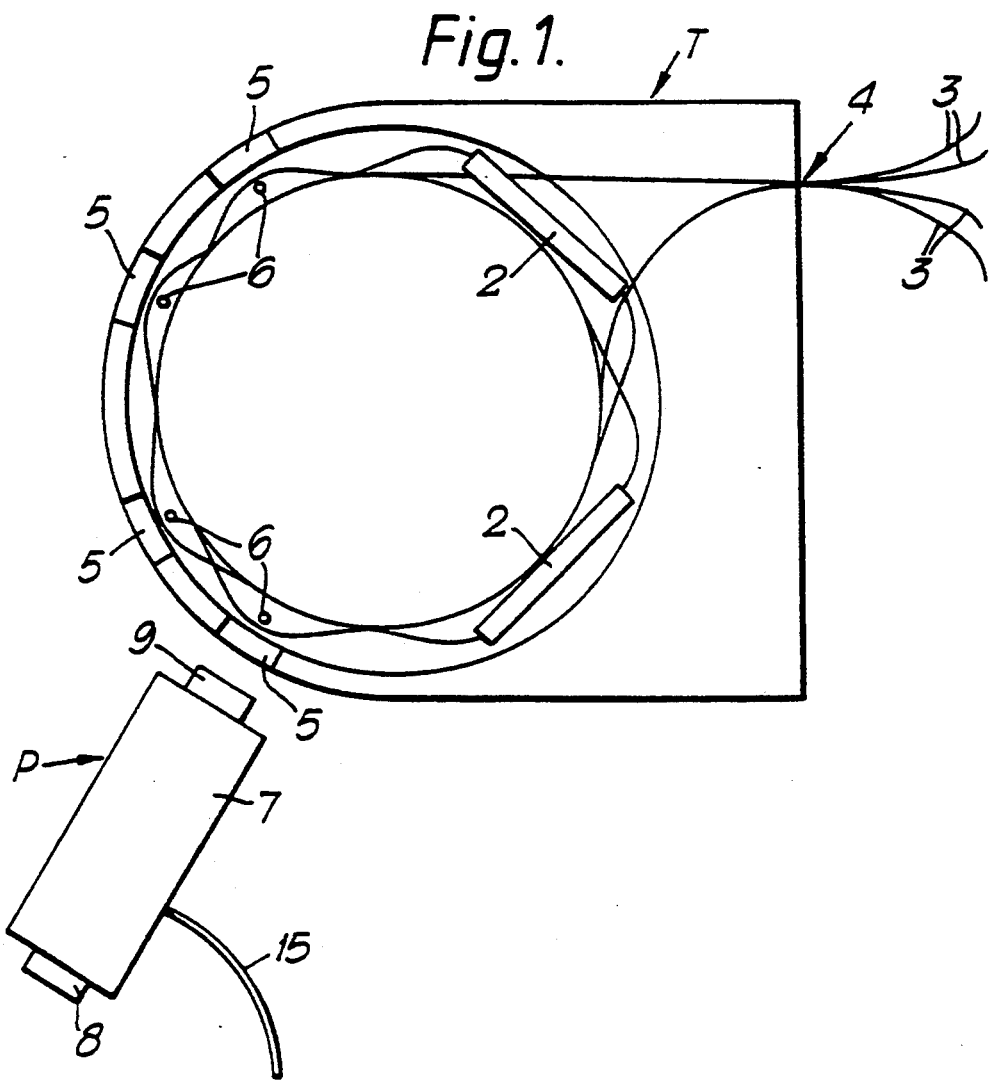
FIG. 1 is a schematic representation of a first form of fibre splice tray and power meter probe constructed in accordance with the invention.

Referring to the drawing, FIG. 1 shows a fibre splice tray T and an optical power meter probe P. The splice tray T is formed with a generally circular internal chamber 1 which houses a pair of spliced fibres, the splices being indicated by the reference numerals 2. Each splice 2 has a respective input fibre and a respective output fibre, the fibres being indicated by the reference numerals 3. The fibres 3 enter and leave the tray T via a fibre entry/exit point 4, and pass around the inner circumference of the chamber 1 in a clockwise direction. For reasons of clarity, parts only of the fibre routes are shown.

The tray T is provided with four windows 5 in the circumferential wall of the chamber 1, each window forming an access point for a respective one of the fibres 3. A respective rubber mandrel 6 is positioned within the splice tray T adjacent to, and centrally of, each of the windows, and a respective fibre 3 passes between each of the mandrels and its associated window. The probe P can be clipped to the tray T (in the manner described below) at each of the windows 5, thereby enabling the tapping out of light from each of the fibres 3 for the purpose of power measurement. Thus, by measuring the optical power in the fibres 3 both upstream and downstream of each of the splices 2, the quality of the splices can be determined.

As best shown in FIGS. 3 and 4, the probe P has a main body 7 which houses a spring-loaded slide 8 carrying an optical head 9. The slide 8 is reciprocable within the main body 7 so as to move the optical head 9 between operating and non-operating positions (as will be described with reference to FIGS. 5a to 5c). The main body 7 is provided with a pair of locating lugs 10. The lugs 10 are made of resilient material, and are spaced apart so as to engage within each of the windows 5 of the splice tray T. The lugs 10 are shaped, at 10a, so as to clip on to the edges of each of the windows 5, thereby to fix the probe P to the splice tray T. As shown in FIG. 4, each of the lugs 10 is formed with a V-shaped recess 10b for receiving and guiding one of the fibres 3.

Figure 2:
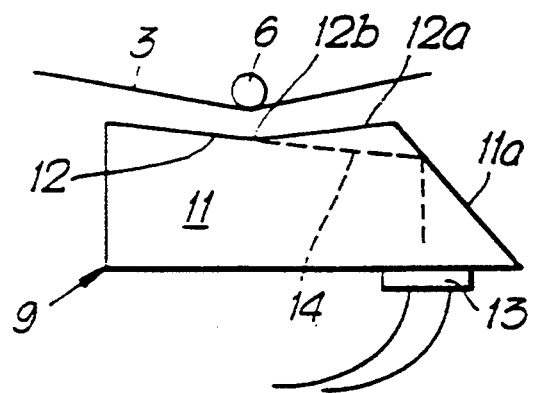
FIG. 2 is a schematic representation, on an enlarged scale, of the optical head forming part of the probe of FIG. 1.

As shown in FIG. 2, the optical head 9 is constituted by a block 11 made of transparent acrylic plastics material. The block 11 is formed with a shallow recess 12 defined by inwardly-inclined surfaces 12a. The surfaces 12a meet at a rounded V-shaped portion 12b, the surfaces defining an included angle of 169°, and the radius of curvature of the rounded portion being 1.75 mm. This type of optical head is described in greater detail in the specification of our co-pending British Patent application no. 9015992.2. The block 11 is provided with a large area photodetector 13 on the opposite surface thereof to the recess 12.

In use, the probe P is aligned with one of the windows 5 of the splice tray T (see FIG. 5a). Its locating lugs 10 are then pushed into the window 5 until the portions 10a clip on to the window edges to lock the probe P to the tray T (as shown in FIG. 5b). The probe P is then activated by pressing in the slide 8, against the force of its spring, thereby forcing the optical head 9 against the associated fibre 3 and the associated mandrel 6 (as shown in FIG. 5c). In this position (the operating position), the optical fibre 3 is urged into the recess 12 by the mandrel 6. When the optical fibre 3 is positioned in the recess 12, the rounded V-shaped portion 12b subjects the fibre to a tight bend of short arcuate length (a kink). This causes light carried by the fibre 3 to leak out of the fibre over a very small region thereof in the vicinity of the rounded V-shaped portion 12b. Light is, therefore, tapped out of the fibre 3 from practically a point source, and then travels through the block 11 in a narrow, but slightly diverging, beam 14. This beam 14 is directed to the photodetector 13 by total internal reflection from an angled side surface 11a of the block 11. The output of the photodetector 13 is coupled to an optical receiver circuit (not shown) and fed, via an umbilical cable 15, to the electronics of a power meter (not shown) associated with the probe P.

It will be apparent that modifications could be made to the arrangement described above with reference to FIGS. 1 to 5. For example, the mandrels 6 could be made of a non-deformable material such as brass or aluminium. It would also be possible to mould the mandrels 6 integrally with the tray T. In another modification, the pressure exerted on a fibre 3 by the optical head 9 could be controlled by mechanical means provided within the probe P. Moreover, the probe P could be used with any type of fibre management unit which requires fibre access for measurement (or detection) purposes. Thus, by providing any such fibre management unit with a respective window/mandrel combination for each fibre which is to be accessed, the probe P could be used for detection or power measurement with minimal fibre disturbance. As an alternative to resilient locating lugs 10, the lugs could be made of a stiff material, in which case they would be actuated mechanically to locate the probe P more positively to the tray T.

FIG. 6 shows a second form of fibre splice tray T' formed with a generally circular internal chamber (not shown) which houses a pair of spliced fibres (not shown). Each splice has a respective input fibre and a respective output fibre (not shown).

The tray T' is provided with four windows 21, each of which passes right through the tray from one planar wall 22a to the opposite planar wall 22b, each window forming an access point for a respective one of the fibres. A probe (not shown) can be aligned with each of the windows 21 to enable light to be trapped out of the associated fibre. Thus, by measuring the optical power in the fibres both upstream and downstream of each of the splices, the quality of the splices can be determined. The probe may be of the type described above with reference to FIGS. 1 to 5, or may be of the type described in the specification of our co-pending International patent application GB91/01184. The probe includes an optical head 23 and a mandrel 24 made of a hard, non-deformable material such as brass or aluminium. The optical head 23 and the mandrel 24 can be positioned centrally of one of the windows 1 on opposite sides thereof.

As shown in FIG. 7, the optical head 23 is constituted by a block 25 made of optical glass. The block 25 is formed with a shallow recess 26 defined by inwardly-inclined surfaces 26a. The surfaces 26a meet at a rounded V-shaped portion 26b, (the rounded apex of this portion not being shown in FIG. 7), the surfaces defining an included angle of 169°, and the radius of curvature of the rounded portion being 1.75 mm. The block 25 is provided with a large area photodetector (not shown) on the opposite surface thereof to the recess 26.

In use, the probe is aligned with one of the windows 21 of the splice tray T'. The probe is then activated to force the optical head 23 against the associated fibre and the mandrel 24. In this position (the operating position), the optical fibre is urged into the recess 26 by the mandrel 24. When the optical fibre is positioned in the recess 26, the rounded V-shaped portion 26b subjects the fibre to a tight bend of short arcuate length (a kink). This causes light carried by the fibre to leak out of the fibre over a very small region thereof in the vicinity of the rounded V-shaped portion 26b. Light is, therefore, tapped out of the fibre from practically a point source, and then travels through the block 25 in a narrow, but slightly diverging, beam. This beam is directed to the photodetector by total internal reflection from an angled side surface 25a of the block 25. The output of the photodetector is coupled to an optical receiver circuit (not shown) and fed, via an umbilical cable, to the electronics of a power meter (not shown) associated with the probe.

It will be apparent that modifications could be made to the arrangement described above with reference to FIGS. 6 and 7. For example each window 1 could be provided with a mandrel rather than having the mandrel forming part of the probe. Also, the mandrel 24 could be made of rubber, the block 25 could be made of transparent acrylic plastics material, the surfaces 26a could define an included angle being within the range of from 150° to 179°, and the radius of curvature of the rounded portion could lie within the range of from 1.5 mm to 3 mm.

It would also be possible in either embodiment, to use the probe as a launch device rather than a detection or power measurement device. In this case, the detector would be replaced by a light source such as LED or a laser.

We claim:

1. Transfer means for transferring light between an optical fibre housed within a fibre management unit and an optical device external to the fibre management unit, the transfer means comprising:
an aperture formed in the fibre management unit, and
a probe housing the optical device,
wherein the probe includes an optical head in optical communication with the optical device, and means for moving the optical head into the aperture to deform the optical fibre against a mandrel sufficiently to permit light to be tapped between the optical fibre and the optical head, the mandrel being positioned, in use, so that the optical fibre lies between the mandrel and the aperture.

2. Transfer means as in claim 1, wherein the mandrel is mounted within the probe.

3. Transfer means as in claim 1, wherein the mandrel is mounted in the fibre management unit adjacent to the aperture and positioned so that the optical fibre lies between the mandrel and the aperture.

4. Transfer means as in claim 1, wherein the probe comprises:
a housing and a support carrying the optical head,
the support being movable relative to the housing thereby constituting the means for moving the optical head.

5. Transfer means as in claim 4, wherein a slide constitutes the support.

6. Transfer means as in claim 4, wherein the housing is provided with locating lugs for locating the probe relative to the aperture.

7. Transfer means as in claim 6, wherein the lugs are resilient.

8. Transfer means as in claim 6, wherein the lugs are formed to clip onto the edges of the aperture.

9. Transfer means as in claim 6, wherein the lugs are provided with V-shaped recesses for holding and guiding an optical fibre.

10. Transfer means as in claim 1, wherein the optical head includes a recessed block made of a transparent material, the recess having a V-shaped cross-section.

11. Transfer means as in claim 10, wherein the V-shaped recess is defined by two surfaces of the block which are inclined to one another at an angle lying within the range of from 150° to 179°.

12. Transfer means as in claim 11, wherein said angle lies within the range of from 160° to 175°.

13. Transfer means as in claim 12, wherein said angle is approximately 169°.

14. Transfer means as in claim 11, wherein said angle lies within the range of from 150° to 160°.

15. Transfer means as in claim 10, wherein the apex of the recess has a rounded cross-section.

16. Transfer means as in claim 15, wherein the radius of curvature of the rounded cross-section lies within the range of from 1.5 to 3 mm.

17. Transfer means as in claim 1, wherein the optical device is a light detector.

18. Transfer means as in claim 17, wherein the detector includes a large area photodetector.

19. Transfer means as in claim 1, wherein the optical device includes a light source.

20. Transfer means as in claim 19, wherein a laser constitutes the light source.

21. Transfer means as in claim 10, wherein:
the optical device is mounted on a surface of the block opposite to the recessed surface, and
a side surface of the block is angled in such a manner that tapped light is subjected to total internal reflection at said side surface, and directed towards the optical device.

22. Transfer means as in claim 1, wherein the fibre management unit includes a fibre splice tray.

23. Transfer means as in claim 22, wherein the fibre splice tray contains a pair of spliced fibres, the splice tray being provided with four apertures, one for each fibre on each side of each splice, a respective mandrel being associated with each of the apertures.

24. A fibre management unit housing an optical fibre, an aperture being formed in the fibre management unit, wherein the aperture is adapted to cooperate with a probe housing an optical device and an optical head in optical communication with the optical device, the probe including means for moving the optical head into the aperture to deform the optical fibre against a mandrel sufficiently to permit light to be tapped between the optical fibre and the optical head, the mandrel being positioned, in use, so that the optical fibre lies between the mandrel and the aperture.

25. A fibre management unit as in claim 24, wherein the mandrel is mounted in the unit adjacent to the aperture and positioned so that the optical fibre lies between the mandrel and the aperture.

26. A probe housing an optical device, the probe being adapted to transfer light between an optical fibre housed within a fibre management unit and the optical device via an aperture formed in the fibre management unit, wherein the probe includes an optical head in optical communication with the optical device, and means for moving the optical head into the aperture so as to deform the optical fibre against a mandrel sufficiently to permit light to be tapped between the optical fibre and the optical head, the mandrel being positioned, in use, so that the optical fibre lies between the mandrel and the aperture.

27. A probe as in claim 26, wherein the mandrel is mounted within the probe.

* * * * *